July 26, 1938. W. D. HAMERSTADT 2,125,004
PIVOTAL MOUNTING FOR PULLEY STRUCTURES
Filed Sept. 25, 1935
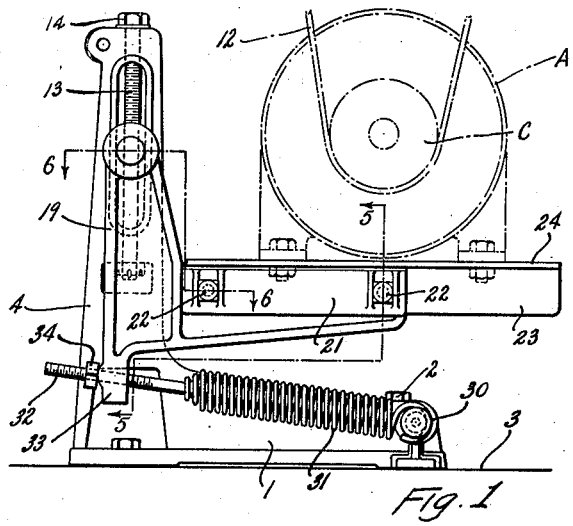
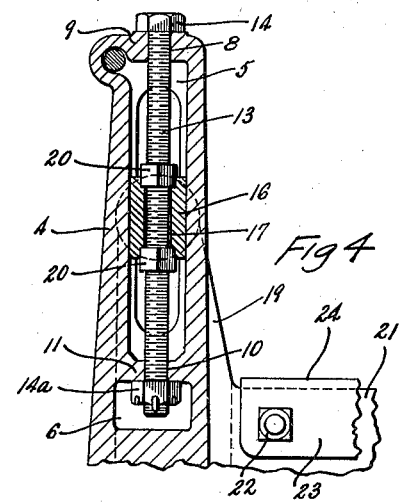
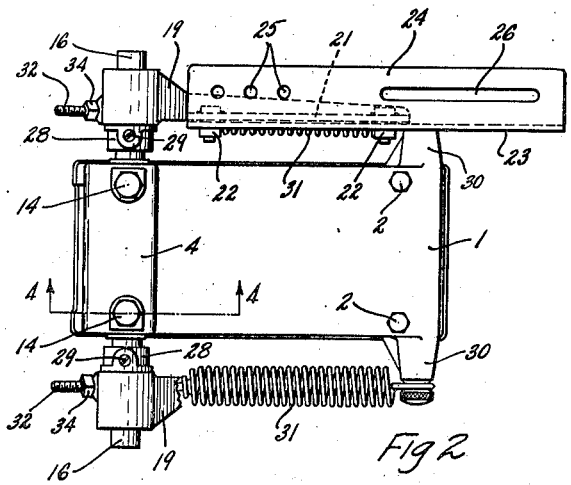
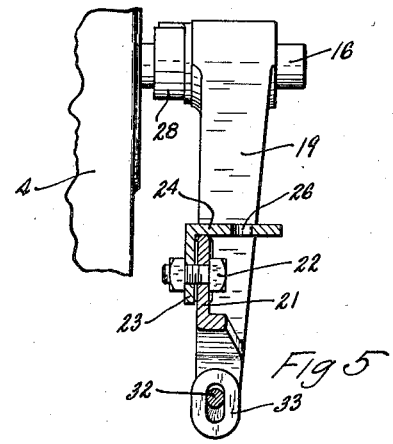
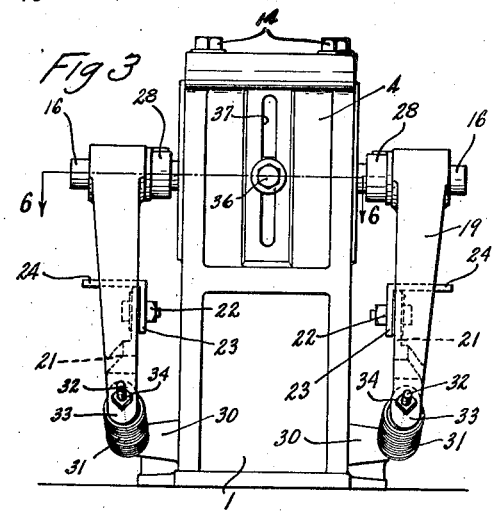
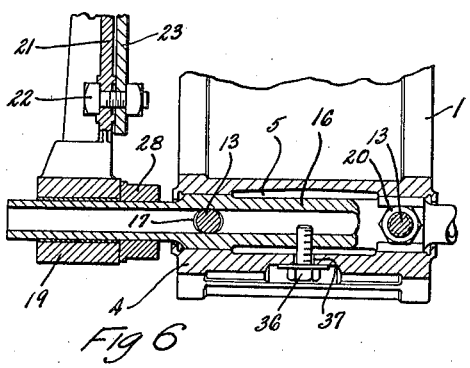
INVENTOR
WILLIAM D. HAMERSTADT
BY
*Brickett, Hyde, Higley & Meyer*
ATTORNEYS Patented July 26, 1938

2,125,004

UNITED STATES PATENT OFFICE 2,125,004

PIVOTAL MOUNTING FOR PULLEY STRUCTURES

William D. Hamerstadt, Indianapolis, Ind., assignor to Rockwood Manufacturing Company, a corporation of Indiana Application September 25, 1935, Serial No. 41,998

6 Claims. (Cl. 248—23)

This invention relates to a pivotal mounting for a pulley structure adapted for use, through the instrumentality of a belt, with a pulley having a fixed center. More particularly, the present invention relates to a mounting for a pulley-carrying motor for driving a fixed center pulley arranged either thereabove or therebelow, the belt connecting such pulleys being generally vertically disposed.

Before the advent of this invention, vertical belt drives were exceedingly troublesome because of the inability to prevent belt slippage with consequent loss of pulley speed. This was due to the fact that in such prior belt drives the entire weight of the belt was carried by the upper pulley, and as belt stretch is inevitable, the belt of such prior drives would fall away from the lower pulley, with consequent belt slippage and loss of pulley speed.

The present improved mounting effectively eliminates this trouble by initially providing for and thereafter maintaining proper belt tension, as the result of which the belt firmly grips both pulleys at all times, regardless of belt stretch, so that a dependable, efficient drive is always assured.

As will hereinafter more fully appear, the present improved mounting includes suitable counter-balancing springs for the pivotally mounted driving motor associated therewith, the tension of said counter-balancing springs being easily and quickly adjustable to enable the belt tension to fit the requirements of each installation and of each operating load.

When the pulley of the pivotally mounted driving motor is located above the driven fixed center pulley, the tension of the counter-balancing springs is so adjusted that said springs themselves produce the proper belt tension, the weight of said driving motor and said belt being borne entirely by said springs. When the pulley of said driving motor is located below the driven fixed center pulley, the tension of said springs is so adjusted that said springs support only that portion of the driving motor's weight which is not needed for belt-tensioning purposes.

Some machines, such as lathes, drill presses and grinders, operate under widely varying loads and for such machines, a constant belt tension is not desirable. High belt tension, established to take care of heavy tool cuts, will be too great for light cuts. Low belt tension, established for light operations, will be inadequate for heavy work. In the former case, the belt and the bearings suffer from needless tension. In the latter case, the capacity of the driven machine is severely crippled by belt slippage and inadequate driving power. By enabling the belt tension to be easily and quickly adjusted to match each change of work, the present improved mounting establishes a new standard of operating performance for motor-driven machines.

Further features of the present improved mounting, and the general character of its construction, will be apparent from the following description of one embodiment thereof, reference being had to the accompanying drawing in which Fig. 1 is a side elevation of a mounting embodying the present invention, a pulley-carrying electric motor being shown thereon in dotted lines; Fig. 2 is a top plan view of said mounting; Fig. 3 is a rear elevation thereof; Fig. 4 is a detail vertical sectional view on the line 4—4, Fig. 2; Fig. 5 is a detail view, partly in elevation and partly in section, on the line 5—5, Fig. 1; and Fig. 6 is a detail cross-sectional view on the line 6—6, Figs. 1 and 3.

The mounting here illustrated includes a suitable metal base 1 adapted to be rigidly secured, such as by bolts 2, to a generally horizontally disposed support 3, such as a floor, platform or the like. Integral with said base, or otherwise rigidly associated therewith, and extending upwardly from the rear end thereof, is a suitable metal standard 4, the upper portion of which is provided with two cavities 5 and 6, Fig. 4, the cavity 5 being an upper cavity of generally rectangular form and generally vertically disposed and the cavity 6 being a lower and smaller cavity, of generally rectangular form and generally horizontally disposed.

Rotatably mounted in suitable openings 8 in the top wall 9 of the standard 4, which wall constitutes the top wall of the cavity 5, and in suitable openings 10 in a cross wall 11 of said standard, which wall separates the cavities 5 and 6, is a pair of vertically disposed adjusting screws 13, the manipulating heads 14 of which, on the upper ends thereof, rest on said standard top wall 9 for convenient accessibility. The body portions of said screws extend through the upper cavity 5 and the lower ends thereof lie within the lower cavity 6, being provided therein with suitable nuts 14a locked thereto, the open sides of said cavity 6 permitting the convenient application of said nuts to said screws.

Extending transversely through the upper cavity 5 of the standard 4 is a suitable pivot rod 16 having a pair of unthreaded openings 17 through which said adjusting screws extend, said pivot rod adjacent said openings being of such cross-sectional size and shape as to slidably engage the front and rear portions of said standard. To enable said pivot rod to be vertically adjusted along one or both of said screws, by rotary movement of one or both thereof, for purposes hereinafter referred to, the upper and lower ends of said pivot rod openings 17, in the embodiment of the invention here shown, are suitably enlarged to non-rotatably receive suitable nuts 20 with which said screws are adjustably provided, there being two such nuts on each screw.

Suitably mounted on the end portions of said pivot rod, which end portions project outwardly from the standard 4 through the open sides of the cavity 5 thereof, is a pair of supporting arm structures which constitute the support for the pulley-carrying driving motor, such as the electric motor A of Fig. 1.

As here shown, each of said motor-supporting arm structures comprises a generally L-shaped arm, here shown as a casting, having the upper end of its generally vertically disposed portion 19 slidably and rotatably mounted on a projecting end portion of the pivot rod 16 and having its generally horizontally disposed portion 21 adapted to have rigidly secured thereto, such as by the bolts 22, the vertically disposed portion 23 of a suitable angle iron member, the horizontally disposed portion 24 of which is provided with suitable bolt-receiving apertures 25 and a suitable bolt-receiving slot 26 for the rigid securement of the motor A thereon, the slots 26 in the two angle iron members enabling motors of various base lengths to be secured thereon.

To prevent sliding movement of said motor-supporting arm structures on the pivot rod 16 when said structures are interconnected by a motor mounted thereon, suitable collars 28 are secured on said pivot rod, such as by set screws 29, between the two arm structures thereon, with the result that said collars do not interfere with removal of said arm structures when they are not so inter-connected.

In order to enable the tension of the driving belt, such as the belt 12, Fig. 1, to be varied to fit the requirements of each installation and of each operating load, the present improved mounting includes suitable counter-balancing springs for the pivotally mounted driving motor, said springs being readily adjustable to enable the proper belt tension to be obtained at all times.

When the pulley of the driving motor, such as the pulley C of the motor A of Fig. 1, is located above the driven fixed center pulley (not shown), the tension of the counter-balancing springs is so adjusted that said springs themselves produce the proper belt tension, the weight of the pivotally mounted driving motor and the driving belt being borne entirely by said springs. When the pulley of the driving motor is located below the driven fixed center pulley, as in Fig. 1, the tension of said springs is so adjusted that said springs support only that portion of the driving motor's weight which is not needed for belt-tensioning purposes.

Inasmuch as some machines, such as lathes, drill presses and grinders, operate under widely varying loads, adjustment of said counter-balancing springs is necessary to enable the belt tension to match each change of work. High belt tension, established for heavy tool cuts, would be too great for light cuts and low belt tension, established for light operations, would be inadequate for heavy work. In the former case, the belt and the bearings would suffer from needless tension and in the latter case, the driven machine would be crippled by inadequate driving power due to belt slippage.

Therefore, by enabling the counter-balancing springs to be readily adjusted to fit each installation and each operating load, a new standard of operating performance for motor-driven machines is attained.

In the embodiment of the invention here illustrated, the base 1 is provided at its front end with a pair of oppositely projecting extensions 30 to each of which is suitably secured the front end of a suitable tension spring 31. Suitably secured to the rear end of each such spring is the headed front end of a suitable rod 32, the threaded rear end portion of which extends through a depending lug 33 with which each motor-supporting arm structure is provided. By adjusting a nut 34 on each such rod 32, the tension of the counter-balancing spring associated therewith may be readily varied, all as will be readily understood.

By enabling the pivot rod 16, and hence the parts carried thereby, to be vertically adjusted, by rotary movement of one or both of the adjusting screws 13, location of the driving motor in relation to the length of the driving belt, at the time of installation, is materially simplified. Moreover, compensation for stretching of said belt in service can be readily taken care of, and true alignment of the driving and driven pulley shafts, for proper belt tracking, can be readily effected.

In the embodiment of the invention here illustrated, suitable clamping means is provided for assisting in the releasable maintenance of said pivot rod in the position to which it is adjusted, said clamping means comprising a suitable clamping screw 36 movable in a vertically disposed slot 37 in the standard 4 and suitably secured to said pivot rod.

Although I prefer to use the present improved mounting as a support for the driving pulley structure, said mounting may be used, of course, as the support for the driven pulley structure, with the driving pulley structure rigidly mounted thereabove or therebelow, all as will be readily understood.

While I have illustrated and described one embodiment of my invention, and have set forth some of the advantages and features thereof, it is to be understood that the scope of my invention is defined by the appended claims.

What I claim is:

1. A pivotal mounting for a pulley structure adapted for use, through the instrumentality of a generally vertically disposed belt, with a pulley having a fixed center, said mounting comprising a base adapted to be rigidly secured to a generally horizontally disposed support, generally vertically disposed standard means associated with said base and extending upwardly therefrom, generally horizontally disposed pivot means associated with said standard means and vertically adjustable relative thereto, generally L-shaped supporting means having generally vertically disposed means and generally horizontally disposed means carried thereby, the generally vertically disposed means of said supporting means being associated with and carried by said pivot means and the generally horizontally disposed means of said supporting means being adapted to have a pulley structure rigidly mounted thereon, and spring means for opposing to a greater or lesser extent downward swinging movement of a pulley structure mounted on the generally horizontally disposed means of said L-shaped supporting means.

2. A pivotal mounting for a pulley structure adapted for use, through the instrumentality of a generally vertically disposed belt, with a pulley having a fixed center, said mounting comprising a base adapted to be rigidly secured to a generally horizontally disposed support, generally vertically disposed standard means associated with said base and extending upwardly therefrom, generally horizontally disposed pivot means associated with said standard means and vertically adjustable relative thereto, generally L-shaped supporting means having generally vertically disposed means and generally horizontally disposed means carried thereby, the generally vertically disposed means of said supporting means being associated with and carried by said pivot means and the generally horizontally disposed means of said supporting means being adapted to have a pulley structure rigidly mounted thereon, and spring means associated with said base and the generally vertically disposed means of said supporting means for opposing to a greater or lesser extent downward swinging movement of a pulley structure mounted on the generally horizontally disposed means of said L-shaped supporting means.

3. A pivotal mounting for a pulley structure adapted for use, through the instrumentality of a generally vertically disposed belt, with a pulley having a fixed center, said mounting comprising a base adapted to be rigidly secured to a generally horizontally disposed support, generally vertically disposed standard means associated with said base and extending upwardly therefrom, generally horizontally disposed pivot means associated with said standard means, means for effecting vertical adjustment of said pivot means relative to said standard means, means separate from and independent of said adjusting means for maintaining said pivot means in any position of adjustment thereof, generally L-shaped supporting means having generally vertically disposed means and generally horizontally disposed means carried thereby, the generally vertically disposed means of said supporting means being associated with and carried by the outer end portions of said pivot means and the generally horizontally disposed means of said supporting means being adapted to have a pulley structure rigidly mounted thereon, and spring means for opposing to a greater or lesser extent downward swinging movement of a pulley structure mounted on the generally horizontally disposed means of said L-shaped supporting means.

4. A pivotal mounting for a pulley structure, adapted for use, through the instrumentality of a generally vertically disposed belt, with a pulley having a fixed center, said mounting comprising a base adapted to be rigidly secured to a generally horizontally disposed support, generally vertically disposed standard means associated with said base and extending upwardly therefrom, generally horizontally disposed pivot means associated with said standard means, two independent means for effecting vertical adjustment of said pivot means relative to said standard means, there being one adjusting means for each of the outer end portions of said pivot means, means cooperating with said standard means and said pivot means for maintaining said pivot means in any position of adjustment thereof, generally L-shaped supporting means having generally vertically disposed means and generally horizontally disposed means carried thereby, the generally vertically disposed means of said supporting means being associated with and carried by the outer end portions of said pivot means and the generally horizontally disposed means of said supporting means being adapted to have a pulley structure rigidly mounted thereon, and spring means for opposing to a greater or lesser extent downward swinging movement of a pulley structure mounted on the generally horizontally disposed means of said L-shaped supporting means.

5. A pivotal mounting for a pulley structure adapted for use, through the instrumentality of a generally vertically disposed belt, with a pulley having a fixed center, said mounting comprising a base adapted to be rigidly secured to a generally horizontally disposed support, generally vertically disposed standard means associated with said base and extending upwardly therefrom, said standard means being provided with a generally vertically disposed cavity, generally horizontally disposed pivot means extending transversely through the cavity of said standard means and having its outer end portions projecting laterally from the outer side edge portions of said standard means, means within the cavity of said standard means for effecting vertical adjustment of said pivot means along said standard means, generally L-shaped supporting means having generally vertically disposed means and generally horizontally disposed means carried thereby, the generally vertically disposed means of said supporting means being associated with and carried by the projecting outer end portions of said pivot means and the generally horizontally disposed means of said supporting means being adapted to have a pulley structure rigidly mounted thereon, and spring means for opposing to a greater or lesser extent downward swinging movement of a pulley structure mounted on the generally horizontally disposed means of said supporting means.

6. A pivotal mounting for a pulley structure adapted for use, through the instrumentality of a generally vertically disposed belt, with a pulley having a fixed center, said mounting comprising a base adapted to be rigidly secured to a generally horizontally disposed support, generally vertically disposed standard means associated with said base and extending upwardly therefrom, said standard means being provided with a generally vertically disposed cavity, generally horizontally disposed pivot means extending transversely through the cavity of said standard means and having its outer end portions projecting laterally from the outer side edge portions of said standard means, vertically disposed screws extending through the cavity of said standard means and through said pivot means for effecting vertical adjustment of said pivot means along said standard means, two independent generally L-shaped supporting structures each having a generally vertically disposed part and a generally horizontally disposed part carried thereby, the generally vertically disposed parts of said supporting structures being associated with and carried by the projecting outer end portions of said pivot means and the generally horizontally disposed parts of said supporting structures being adapted to have a pulley structure rigidly mounted thereon, and adjustable spring means associated with said base and said supporting structures for opposing to a greater or lesser extent downward swinging movement of a pulley structure mounted on the generally horizontally disposed parts of said supporting structures.

WILLIAM D. HAMERSTADT.